United States Patent
Kameda

(10) Patent No.: US 7,733,604 B2
(45) Date of Patent: Jun. 8, 2010

(54) PERPENDICULAR MAGNETIC RECORDING HEAD WITH RETURN PASS LAYER

(75) Inventor: Hiroshi Kameda, Niigata-ken (JP)

(73) Assignee: TDK Corporation, Tokyo (JP)

( * ) Notice: Subject to any disclaimer, the term of this patent is extended or adjusted under 35 U.S.C. 154(b) by 730 days.

(21) Appl. No.: 11/296,085

(22) Filed: Dec. 6, 2005

(65) Prior Publication Data

US 2006/0126223 A1 Jun. 15, 2006

(30) Foreign Application Priority Data

Dec. 10, 2004 (JP) .............................. 2004-357571

(51) Int. Cl.
*G11B 5/127* (2006.01)
(52) U.S. Cl. ................. 360/125.2; 360/125.21
(58) Field of Classification Search .............. 360/125.2, 360/125.21, 125.1, 125.11, 125.14, 125.15, 360/125.4, 125.47, 125.48, 125.52, 125.53, 360/125.6, 125.61, 125.65, 125.66
See application file for complete search history.

(56) References Cited

U.S. PATENT DOCUMENTS

| | | | | |
|---|---|---|---|---|
| 5,075,956 A | * | 12/1991 | Das | 29/603.14 |
| 5,680,283 A | * | 10/1997 | Tanaka et al. | 360/125.03 |
| 5,854,727 A | * | 12/1998 | Tanaka et al. | 360/125.03 |
| 6,330,127 B1 | * | 12/2001 | Sasaki | 360/125.65 |
| 6,441,995 B1 | * | 8/2002 | Sasaki | 360/125.65 |
| 6,452,743 B1 | * | 9/2002 | Sasaki | 360/125.43 |
| 6,483,665 B1 | * | 11/2002 | Sasaki | 360/125.53 |
| 6,707,642 B1 | * | 3/2004 | Batra | 360/125.53 |
| 6,826,012 B1 | * | 11/2004 | Sasaki | 360/125.42 |
| 2002/0024765 A1 | * | 2/2002 | Kutsuzawa et al. | 360/126 |
| 2004/0004787 A1 | * | 1/2004 | Matono et al. | 360/126 |
| 2004/0151036 A1 | | 8/2004 | Aoyagi et al. | |
| 2004/0240108 A1 | * | 12/2004 | Shukh | 360/125 |
| 2006/0067006 A1 | * | 3/2006 | Takagishi et al. | 360/319 |

FOREIGN PATENT DOCUMENTS

| | | |
|---|---|---|
| JP | 2004-39148 | 2/2004 |
| JP | 2004-127407 | 4/2004 |
| JP | 2006-99891 | 4/2006 |

* cited by examiner

*Primary Examiner*—William J Klimowicz
*Assistant Examiner*—Adam B Dravininkas
(74) *Attorney, Agent, or Firm*—Brinks Hofer Gilson & Lione

(57) ABSTRACT

A length in a height direction from each end of a front portion of a return-pass layer (first magnetic layer) may be shorter than a length in the height direction from a midpoint of the front portion. As a result, a recording magnetic field may not be concentrated on and may not return to the ends of the front portion, and the intensity of the magnetic field generated from the ends toward the recording medium may be weakened, whereby it may be possible to appropriately suppress the erasing phenomenon of a recorded signal.

7 Claims, 7 Drawing Sheets

PERPENDICULAR MAGNETIC RECORDING HEAD WITH RETURN PASS LAYER

This application claims the benefit of priority to Japanese Patent Application 2004-357571, which was filed on Dec. 10, 2004, and which is incorporated herein by reference.

TECHNICAL FIELD

The present invention relates to a perpendicular magnetic recording head that induces a magnetic field on a recording medium in a direction perpendicular to a medium surface of the recording medium, such as a disk, to perform recording, and more particularly, to a perpendicular magnetic recording head which is capable of suppressing an erasing phenomenon of a recorded signal.

BACKGROUND

As shown in FIG. 12 (which is a partial plan view showing a perpendicular magnetic recording head), a recording magnetic head using a perpendicular magnetic recording method that magnetizes a recording medium in a direction perpendicular to a medium surface of the recording medium includes a first magnetic layer (a return-pass layer) 1, a second magnetic layer (a main magnetic pole layer) 2, and coil layers (not shown) for inducing recording magnetic fields on the first magnetic layer 1 and the second magnetic layer 2. The return-pass layer 1 and the main magnetic pole layer 2 face each other with a predetermined space interposed therebetween in the thickness direction. An induction field generated by a flow of an electric current through the coil layers is induced on the return-pass layer 1 and the main magnetic pole layer 2, and a recording magnetic field enters the recording medium in the direction perpendicular to the medium surface of the recording medium from a front end surface 2a that is flush with a facing surface of the main magnetic pole layer 2 facing the recording medium. The recording magnetic field passes through the recording medium and reaches the return-pass layer 1.

As shown in FIG. 12, the return-pass layer 1 has a substantially rectangular plan shape in the related art. If the plan shape of the return-pass layer is formed in a substantially rectangular shape, the recording magnetic field that passes through the recording medium and reaches the return-pass layer 1 may be concentrated on and to return to the ends (corners) 1b of a front end surface 1a of the return-pass layer 1 flush with the facing surface. A lower part in FIG. 12 is a graph showing a relationship between a position along the front end surface 1a of the return-pass layer 1 in the track-width direction and the intensity of the magnetic field generated toward the medium. As shown in the lower part of FIG. 12, since a strong magnetic field is generated from each of the corners 1b of the front end surface 1a of the return-pass layer 1, a phenomenon that erases a signal written on the recording medium may occur at each of the corners 1b.

There has been an attempt to position the corners shown in FIG. 12 as far away as possible from the facing surface in the height direction in order to suppress the phenomenon of erasing a recorded signal. That is, as shown in FIG. 13, sloping surfaces 1c and 1c may be formed on both sides of the front end surface 1a of the return-pass layer 1 in the track-width direction (X direction) so that a width between the sloping surfaces in the track-width direction (X direction) gradually increases from the facing surface in the height direction (Y direction).

A structure in which the sloping surfaces 1c and 1c are formed on both sides of the front end surface 1a of the return-pass layer 1 is disclosed in each of JP-A Nos. 2004-39148 and 2004-12740 (corresponding to US Publication Nos. 2004004787A1 and 2004151036A1, respectively).

However, even in the case of the structure shown in FIG. 13, corners 1e are formed between the front end surface 1a of the return-pass layer 1 and each of the sloping surfaces 1c, respectively. As a result, since a recording magnetic field may be concentrated on and return to each of the corners 1e, a strong magnetic field may be generated from each of the corners 1e toward the medium. For this reason, it is not possible to appropriately suppress the phenomenon of erasing a recorded signal in the structure shown in FIG. 13.

BRIEF SUMMARY

A perpendicular magnetic recording head that may be capable of appropriately suppressing a phenomenon of erasing a recorded signal may be formed by modifying a shape of a rear end surface of the first magnetic layer.

According to one embodiment, a perpendicular magnetic recording head includes a first magnetic layer and a second magnetic layer, and magnetic field generating units that induce recording magnetic fields in the first magnetic layer and the second magnetic layer. The first magnetic layer has a front end surface and a rear end surface. The front end surface has a front portion disposed parallel to a facing surface facing a recording medium, and a length of the first magnetic layer in a height direction from an end of the front portion may be shorter than a length of the first magnetic layer in the height direction from a midpoint of the front portion.

As a result, a recording magnetic field may not be concentrated on and may not return to the ends of the front portion, and the intensity of the magnetic field generated from each end toward the recording medium may be weakened, whereby it may be possible to appropriately suppress the erasing phenomenon of a recorded signal compared to the related art.

DETAILED DESCRIPTION

Figure 1:
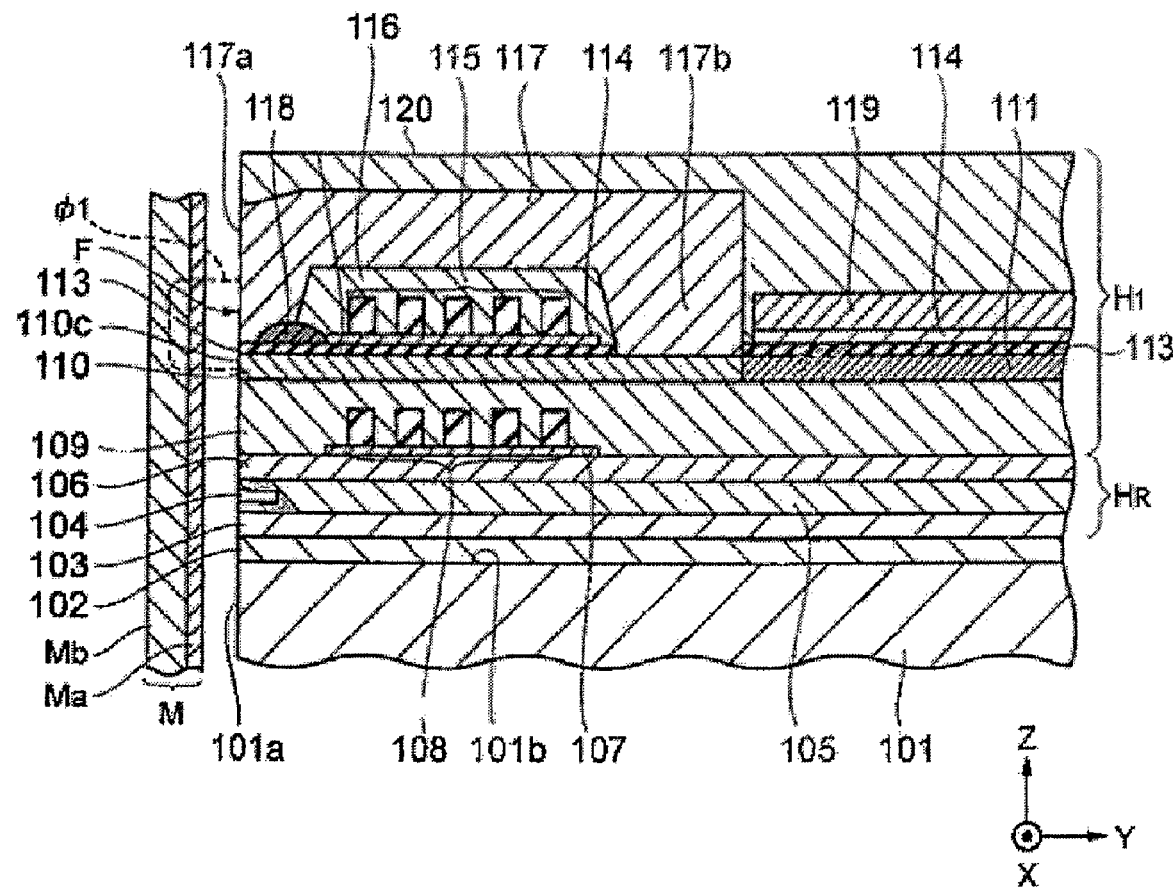
FIG. 1 is a partial cross-sectional view showing a perpendicular magnetic recording head according to one embodiment.
Figure 2:
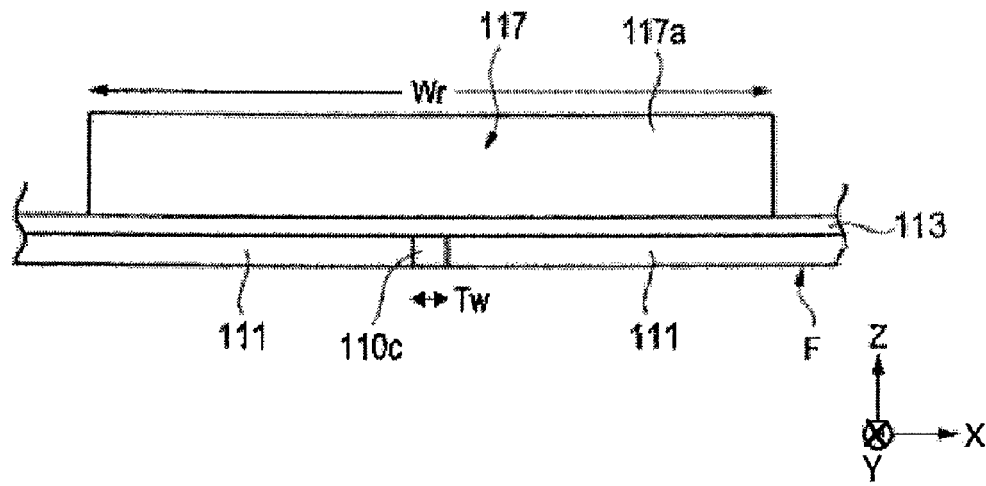
FIG. 2 is a partial front view showing the perpendicular magnetic recording head shown in FIG. 1.

FIG. 1 is a partial cross-sectional view showing a perpendicular magnetic recording head according to one embodiment, and FIG. 2 is a partial front view showing the perpendicular magnetic recording head shown in FIG. 1. In addition, FIGS. 3 to 10 are partial plan views showing perpendicular magnetic recording heads according to various embodiments, and particularly showing the perpendicular magnetic recording heads each having a different shape of a first magnetic layer, and FIG. 11 is a partial cross-sectional view showing a perpendicular magnetic recording head according to the invention having a structure different from that of the perpendicular magnetic recording head shown in FIG. 1.

A perpendicular magnetic recording head H1 shown in FIG. 1 may induce a perpendicular magnetic field on a recording medium M to magnetize a hard magnetic film Ma of the recording medium M in the perpendicular direction.

The recording medium M may be formed, for example, in a disk shape, and the hard magnetic film Ma with high residual magnetization on the surface thereof may have a soft magnetic film Mb with high magnetic permeability. In this case, the recording medium may be rotated about a center of the disk as a rotation center.

A slider 101 may be made of a non-magnetic material, such as $Al_2O_3$ or TiC, and a facing surface 101a of the slider 101 faces the recording medium M. When the recording medium M is rotated, the slider 101 may rise from the surface of the recording medium M or the slider 101 may slide on the recording medium M.

A non-magnetic insulating layer 102 made of an inorganic material, such as $Al_2O_3$ or $SiO_2$, may be formed on a surface 101b on the side of the trailing end of the slider 101, and reading part $H_R$ may be formed on the non-magnetic insulating layer 102.

The reading part $H_R$ may include a lower shielding layer 103, an upper shielding layer 106, and a reading element 104 provided in an inorganic insulating layer (gap insulating layer) 105 interposed between the lower shielding layer 103 and the upper shielding layer 106. The reading element 104 may be a magnetoresistive effect element such as AMR, GMR, or TMR.

A plurality of first coil layers 108 made of a conductive material may be formed on the upper shielding layer 106 with a coil insulating foundation layer 107 interposed therebetween. Each of the first coil layers 108 may be made of one or more non-magnetic metallic materials selected from Au, Ag, Pt, Cu, Cr, Al, Ti, NiP, Mo, Pd, Rh. Alternatively, each of the first coil layers may have a laminated structure in which the non-magnetic metallic materials are laminated.

A coil-insulating layer 109 made of an inorganic insulating material such as $Al_2O_3$ or a resistor may be formed around each of the first coil layers 108.

The upper surface of the coil-insulating layer 109 may be formed flat, and a coating foundation layer (not shown) may be formed on the upper surface thereof. A main magnetic pole layer (second magnetic layer) 110 may be formed on the coating foundation layer so that the main magnetic pole layer has a predetermined length from a surface F (hereinafter, simply referred to as a facing surface F), which faces a recording media, in the height direction (Y direction) and has a width of a track width Tw of a front end surface 110c in the track-width direction (X direction: first direction)

The main magnetic pole layer 110 may be made of a ferromagnetic material, for example, a material having high saturation magnetic flux density, such as Ni—Fe, Co—Fe, or Ni—Fe—Co.

Figure 3:
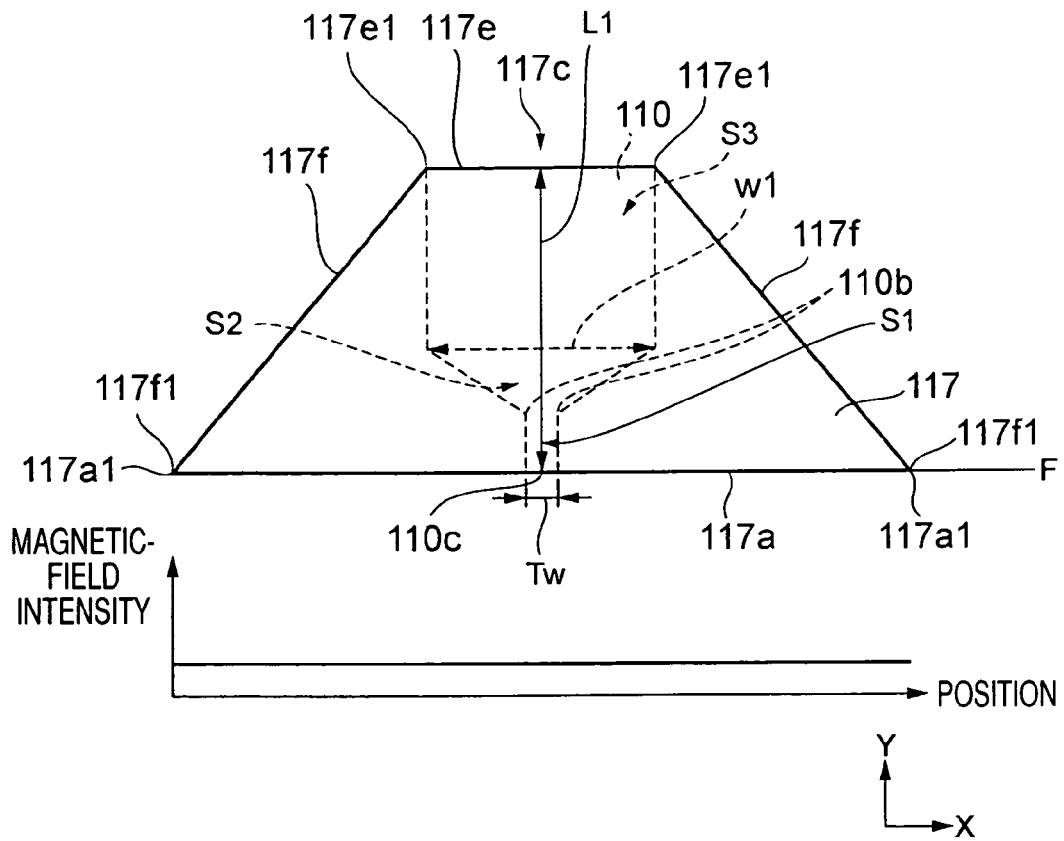
FIG. 3 is a partial plan view showing the perpendicular magnetic recording head according to one embodiment, and particularly showing the perpendicular magnetic recording head having a different shape of a first magnetic layer.

As shown in FIG. 3, the main magnetic pole layer 110 may be provided with a sloping portion S2 and a rear portion S3. The sloping portion S2 and the rear portion S3 may extend from a base portion 110b of a front region S1 in the height direction (Y direction; second direction) so that a width W1 in the track-width direction (the first direction) is larger than the track width Tw. The front region S1 may be referred to as a main magnetic pole layer, and the sloping portion S2 and the rear portion S3 may be referred to as a yoke layer.

In the perpendicular magnetic recording head H1 shown in FIG. 1, the main magnetic pole layer 110 may be composed of a magnetic layer positioned on the side of the reading part $H_R$.

Specifically, the track width Tw may be in the range of from about 0.01 µm to about 0.5 µm, and the length of the front region S1 in the height direction may be in the range of from about 0.01 µm to about 0.5 µm.

Furthermore, the widest width W1 of the rear portion S3 in the track-width direction (X direction) may be in the range of from about 0.1 µm to about 1000 µm, and lengths of the sloping portion S2 and the rear portion S3 in the height direction may be in the range of from about 1 µm to about 1000 µm.

Moreover, shapes of the main magnetic pole layers 110 shown FIGS. 3 to 10 may be all the same.

As shown in FIG. 1, a first insulating material layer 111 may be formed on both sides and the rear side in the height direction of the main magnetic pole layer 110. The first insulating material layer 111 may be made of, for example, $Al_2O_3$ or Al—Si—O.

A gap layer 113 made of an inorganic material such as alumina or $SiO_2$ may be formed on the main magnetic pole layers 110 and the first insulating material layer 111.

As shown in FIG. 1, second coil layers 115 may be formed on the gap layer 113 with a coil insulating foundation layer 114 interposed therebetween. Similar to the first coil layers 108, a plurality of second coil layers 115 may be made of a conductive material. Each of the second coil layers 115 may be made of one or more non-magnetic metallic materials selected from Au, Ag, Pt, Cu, Cr, Al, Ti, NiP, Mo, Pd, Rh. Alternatively, each of the second coil layers may have a laminated structure in which the non-magnetic metallic materials are laminated.

End portions of the first coil layers and the second coil layers may be connected to each other in the track-width direction (X direction) so that the first coil layers 108 and the second coil layers 115 form a toroidal shape, respectively. A shape of each of the coil layers (magnetic field generating means) is not limited to a toroidal shape.

A coil-insulating layer 116 made of an inorganic insulating material such as $Al_2O_3$ or a resistor may be formed around each of the second coil layers 115, and a return-pass layer 117 corresponding to the first magnetic layer of the invention may be formed of a ferromagnetic material, such as a permalloy, over from the coil-insulating layer 116 to the gap layer 113. On a rear side of the return-pass layer 117 in the height direction is a connecting portion 117b for connecting the return-pass layer with the main magnetic pole layer 110. In addition, a Gd deciding layer 118 made of an inorganic or organic material may be formed on the gap layer 113 at a position away from the facing surface F by a predetermined distance. A gap depth of the magnetic head H1 is defined as a distance from the facing surface F to the front end edge of the Gd deciding layer 118.

A lead layer 119 extending from the second coil layers 115 may be formed on the rear side of the return-pass layer 117 in the height direction with the coil insulating foundation layer 114 interposed between the lead layer and the gap layer. Meanwhile, the return-pass layer 117 and the lead layer 119 may be covered with a protecting layer 120 made of a non-magnetic inorganic insulating material.

As shown in FIG. 2, a thickness of the front end surface 110c of the main magnetic pole layer 110 may be smaller than that of the front end surface 117a of the return-pass layer 117, and the width Tw of the front end surface 110c of the main magnetic pole layer 110 in the track-width direction (X direction) may be sufficiently shorter than the width Wr of the front end surface 117a of the return-pass layer 117 in the track-width direction (X direction). As a result, on the facing surface F, an area of the front end surface 110c of the main magnetic pole layer 110 may be sufficiently smaller than that of the front end surface 117a of the return-pass layer 117. Accordingly, magnetic flux of a leakage recording magnetic field may be concentrated on the front end surface 110c of the main magnetic pole layer 110, and the hard magnetic film Ma may be magnetized in the perpendicular direction by the concentrated magnetic flux. For this reason, magnetic data may be recorded.

Characteristic parts of the invention will be described below.

As shown in FIG. 3, the return-pass layer 117 includes the front end surface 117a and a rear end surface 117c. The front end surface 117a is closer to the facing surface F than is the rear end surface 117c.

The portion of the front end surface 117a disposed parallel to the facing surface F may be referred to as a "frontmost end surface." In the embodiment shown in FIG. 3, the frontmost end surface 117a may be an exposed surface positioned flush with the facing surface F. Alternatively, the frontmost end surface 117a may be not an exposed surface positioned flush with the facing surface F. That is, the frontmost end surface 117a may be slightly set back from the facing surface F in the height direction. However, the return-pass layer 117 is a part that receives (couples) a recording magnetic field returning from the main magnetic pole layer 110 through the recording medium M, and when the frontmost end surface 117a is set back from the facing surface F, the return-pass layer may not be appropriately coupled. For this reason, since the perpendicular magnetic field returning from the main magnetic pole layer 110 may broaden, recording efficiency may decline.

Therefore, it is preferable that the frontmost end surface 117a be an exposed surface positioned flush with the facing surface F.

As shown in FIG. 3, a rear end surface 117c of the return-pass layer 117 may include the rearmost end surface 117e and sloping surfaces 117f. The rearmost end surface 117e extends parallel to the track-width direction (X direction) and is formed at the position farthest away from the facing surface F in the height direction (Y direction). Further, the sloping surfaces 117f are formed so that a width between the sloping surfaces in the track-width direction (X direction) gradually increases from both ends 117e1 of the rearmost end surface 117e toward the facing surface F. Each of the ends 117f1 of the sloping surfaces 117f on the side of the facing surface F meets with each of the ends 117a1 of the frontmost end surface 117a. Accordingly, as shown in FIG. 3, a plan shape of the return-pass layer 117 may be substantially trapezoidal.

As shown in FIG. 3, the return-pass layer 117 has a length L1 in the height direction (Y direction) from a midpoint of the frontmost end surface 117a, and a length in the height direction from each of the ends 117a1 of the frontmost end surface 117a may be smaller than the length L1.

As a result, it may be difficult to concentrate magnetic flux on the ends 117a1 of the frontmost end surface 117a of the return-pass layer 117, and the intensity of the magnetic field generated from each end 117a1 toward the recording medium M may be weakened compared to that in the related art. A lower part in FIG. 3 is a graph showing a relationship between a position along the frontmost end surface 117a in the track-width direction and the magnetic field intensity generated toward the recording medium M. As shown in FIG. 3, it may be possible to suppress the phenomenon in which a magnetic field is strongly generated from the ends 117a1 in the related art. Therefore, compared to the related art, it may be possible to further suppress the phenomenon in which a recorded signal is erased on each end 117a1 of the frontmost end surface 117a.

Since volumes of the return-pass layer 117 near the ends 117a1 may be smaller than a volume of the return-pass layer 117 near the midpoint in the track-width direction, it may be difficult to concentrate magnetic flux on the ends 117a1 of the frontmost end surface 117a of the return-pass layer 117. In this case, since the whole return-pass layer 117 may be formed to have a uniform film thickness, the volume may be measured by the length in the height direction.

In addition, in the embodiment shown in FIG. 3, each of the ends 117f1 of the sloping surfaces 117f formed on the rear end surface 117c of the return-pass layer 117 meets with each of the ends 117a1 of the frontmost end surface 117a. Accordingly, there is no linear surface parallel to the height direction (Y direction) near the ends 117a1. For this reason, it may be difficult to form a magnetic domain magnetized in the height direction near the ends 117a1 of the frontmost end surface 117a, and a magnetic domain magnetized in the track-width direction (X direction) may be formed near the ends 117a1. That is, since shape anisotropy in the track-width direction may be obtained near the ends 117a1, the magnetic field may not be generated from the ends 117a1 toward the recording medium M.

Furthermore, if the return-pass layer 117 is formed in the shape shown in FIG. 3, it may be effective as a countermeasure against an external magnetic field. For example, when the perpendicular magnetic recording head H1 shown in FIG. 1 is mounted in various electronic components such as computer terminals (mobile), the external magnetic field generated from the magnetic product owned by a user occasionally may have a negative influence on the perpendicular magnetic recording head H1. Even in this case, the external magnetic field may not be concentrated on and absorbed into the ends 117a1 of the frontmost end surface 117a of the return-pass layer 117. Accordingly, it may be possible to suppress the erasing phenomenon of a recorded signal caused by the external magnetic field.

Figure 4:
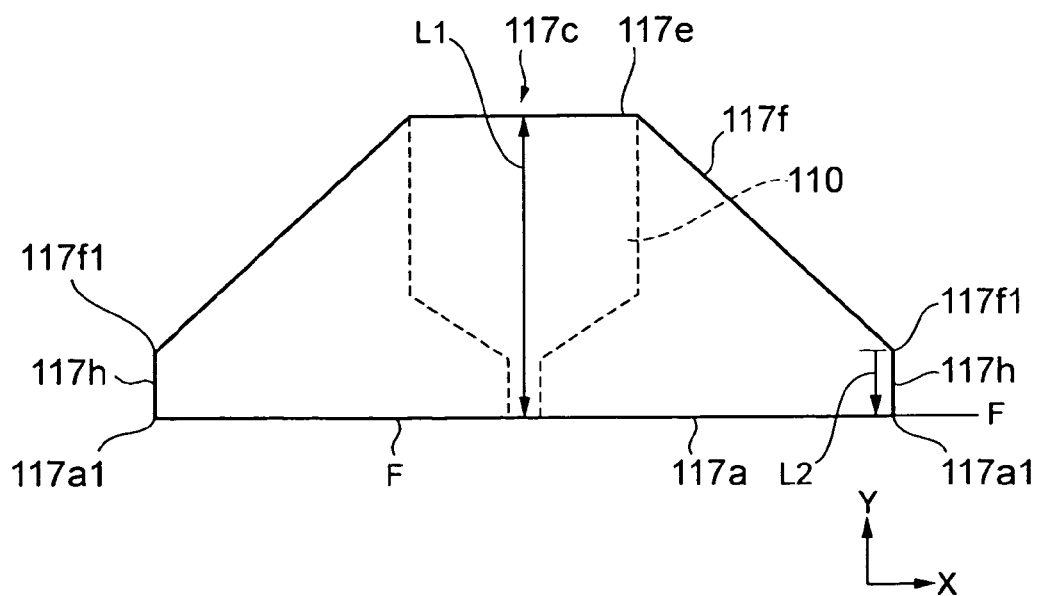
FIG. 4 is a partial plan view showing the perpendicular magnetic recording head according to another embodiment, and particularly showing the perpendicular magnetic recording head having a different shape of the first magnetic layer.

An embodiment shown in FIG. 4 may be different from that shown in FIG. 3 in terms of the shape of the return-pass layer 117. In the embodiment shown in FIG. 4, a return-pass layer includes a rear end surface 117c, a front end surface 117a and side surfaces 117h. The rear end surface 117c includes the rearmost end surface 117e, and sloping surfaces 117f. Each of the side surfaces 117h connects each of the ends 117a1 of the frontmost end surface 117a with each end 117f1 of the sloping surfaces 117f, and extends parallel to a height direction (Y direction). In the embodiment shown in FIG. 4, the return-pass layer has a length L2 in the height direction (Y direction) from each of the ends 117a1 of the frontmost end surface 117a, and the length L2 in the height direction may be longer than the that in the embodiment shown in FIG. 3. However, even in the embodiment shown in FIG. 4, the length L2 from each of the ends 117a1 of the frontmost end surface 117a in the height direction (Y direction) may be shorter than the length L1 of the return-pass layer 117 from a midpoint of the frontmost end surface 117a in the height direction. For this reason, it may be difficult to concentrate magnetic flux on the ends 117a1 of the frontmost end surface 117a of the return-pass layer 117, and the intensity of the magnetic field generated from the ends 117a1 toward the recording medium M may be weakened compared to that in the related art. Accordingly, it may be possible to suppress the phenomenon in which magnetic field intensity generated from the ends 117a1 is more intense compared to that generated from other positions of the return-pass layer 117, and to more appropriately suppress the erasing phenomenon of a recorded signal compared to that in the related art.

Figure 5:
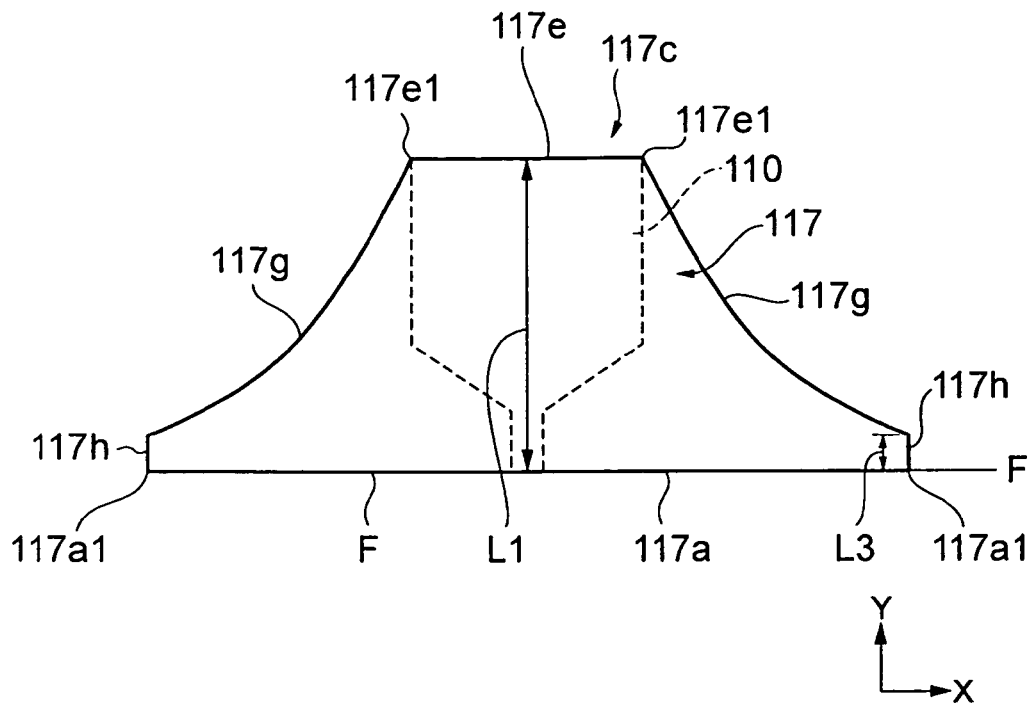
FIG. 5 is a partial plan view showing the perpendicular magnetic recording head according to another embodiment, and particularly showing the perpendicular magnetic recording head having a different shape of the first magnetic layer.

An embodiment shown in FIG. 5 may be different from that shown in FIG. 4 in terms of the shape of the rear end surface 117c of the return-pass layer 117. In FIG. 5, the rear end surface 117c includes the rearmost end surface 117e and sloping surfaces 117g. The rearmost end surface 117e is formed parallel to the track-width direction (X direction) at the position farthest away from the facing surface F in the height direction. Further, the sloping surfaces 117g are formed so that a width between the sloping surfaces in the track-width direction (X direction) gradually increases from the side ends 117e1 and 117e1 of the rearmost end surface 117e toward the ends 117a1 of the frontmost end surface 117a. In this case, in FIG. 5, each of the sloping surfaces 117g may be formed in a curved shape. In FIG. 5, each of the sloping surfaces 117g may be concavely formed toward the facing surface F. In the embodiment shown in FIG. 6, a rear end surface 117c of the return-pass layer 117 is composed of the rearmost end surface 117e and curved sloping surfaces 117n, similar to the embodiment shown in FIG. 5. However, in FIG. 6, each of the sloping surfaces 117n may be formed in a convex shape in a direction away from the facing surface F (that is, in the height direction).

Figure 6:
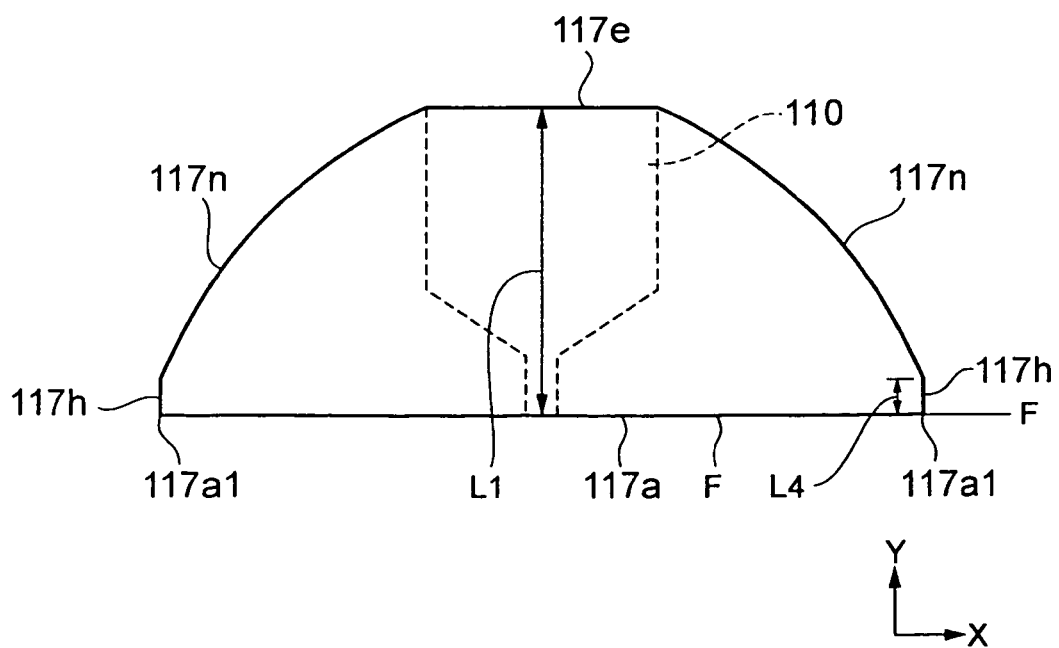
FIG. 6 is a partial plan view showing the perpendicular magnetic recording head according to another embodiment, and particularly showing the perpendicular magnetic recording head having a different shape of the first magnetic layer.

In the case of the shape of the return-pass layer 117 shown in FIG. 5, volumes of the return-pass layer 117 near the ends 117a1 of the frontmost end surface 117a may be smaller than the volumes corresponding to the shape shown in FIG. 6. For this reason, in the case of the shape of the return-pass layer shown in FIG. 5 compared to the shape of that shown in FIG. 6, it may be difficult to concentrate magnetic flux in the vicinity of the ends 117a1 of the frontmost end surface 117a. Thus, the intensity of the magnetic field generated from the ends 117a1 toward the recording medium M may be appropriately weakened. In the embodiment shown in FIG. 6, a length L4 in the height direction from each of the ends 117a1 of the frontmost end surface 117a may be shorter than the length L1 of the return-pass layer 117 in the height direction from the midpoint of the frontmost end surface 117a. For this reason, it may be difficult to concentrate magnetic flux on the ends 117a1 of the frontmost end surface 117a, and the intensity of the magnetic field generated from the ends 117a1 toward the recording medium M may be appropriately weakened compared to that in the related art.

Figure 7:
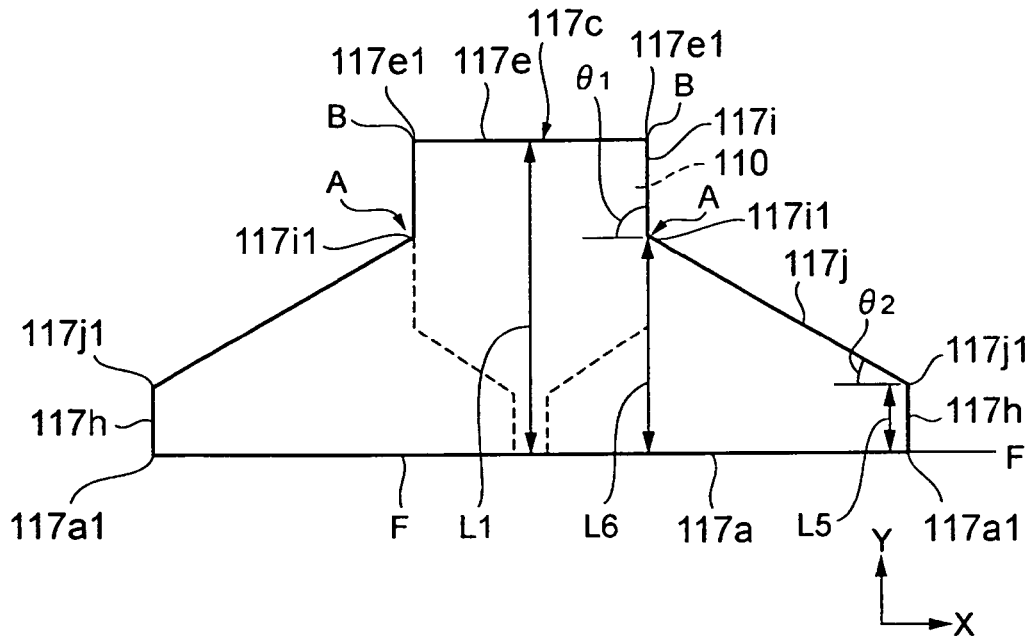
FIG. 7 is a partial plan view showing the perpendicular magnetic recording head according to another embodiment, and particularly showing the perpendicular magnetic recording head having a different shape of the first magnetic layer.

In an embodiment shown in FIG. 7, a rear end surface 117c of the return-pass layer 117 includes the rearmost end surface 117e, first regulating surfaces 117i, and sloping surfaces (second regulating surfaces) 117j. The rearmost end surface 117e is formed parallel to the track-width direction at the position farthest away from the facing surface F in the height direction (Y direction). Further, the first regulating surfaces face a direction parallel to the height direction (Y direction) from the side ends 117e1 and 117e1 of the rearmost end surface 117e. Furthermore, the sloping surfaces are inclined so that a width between the sloping surfaces in the track-width direction gradually increases from ends (connecting ends) 117i1 of the first regulating surfaces 117i on the side of the facing surface F toward the ends 117a1 of the frontmost end surface 117a.

In the embodiment shown in FIG. 7, corners A connecting the first regulating surfaces 117i with the second regulating surfaces 117j as well as corners B connecting the rearmost end surface 117e with the first regulating surfaces 117i are formed on the rear end surface 117c.

At each of the corners A, an angle θ1 between the track-width direction (X direction) and the direction parallel to the first regulating surfaces 117i may be larger than an angle θ2 between the track-width direction (X direction) and the direction parallel to the second regulating surfaces 117j. As a result, each of the corners A has an angle larger than 180° as viewed from the facing surface F. When the corners are formed on the rear end surface 117c, a magnetic domain magnetized in the height direction may be formed at each of the corners A. In particular, each of the first regulating surfaces 117i is a surface facing a direction parallel to the height direction (Y direction) in the embodiment shown in FIG. 7. Accordingly, a magnetic domain magnetized in the height direction may be formed near each of the corners A. Preferably each of the corners A is as far away as possible from the frontmost end surface 117a in the height direction (Y direction). If each of the corners A is close to the frontmost end surface 117a, magnetism may leak out from a magnetic domain magnetized in the height direction toward the medium M. Therefore, the erasing phenomenon of a recorded signal may occur at a position of the frontmost end surface 117a having each of the corners A on the rear side thereof.

In the embodiment shown in FIG. 7, the second regulating surfaces 117j may be composed of sloping surfaces. The sloping surfaces may be inclined so that a width between the sloping surfaces in the track-width direction gradually increases toward the ends 117a1 of the frontmost end surface 117a. As a result, a length L5 in the height direction from each of the ends 117a1 of the frontmost end surface 117a may be appropriately formed to be short, and a length L6 in the height direction from each of the corners A to the frontmost end surface 117a may be appropriately formed to be long. Accordingly, the intensity of the magnetic field generated from the ends 117a1 of the frontmost end surface 117a toward the recording medium M may be appropriately weakened compared to that in the related art, and the intensity of the magnetic field generated from the position of the frontmost end surface 117a having each of the corners A on the rear side thereof may also be weakened.

Figure 8:
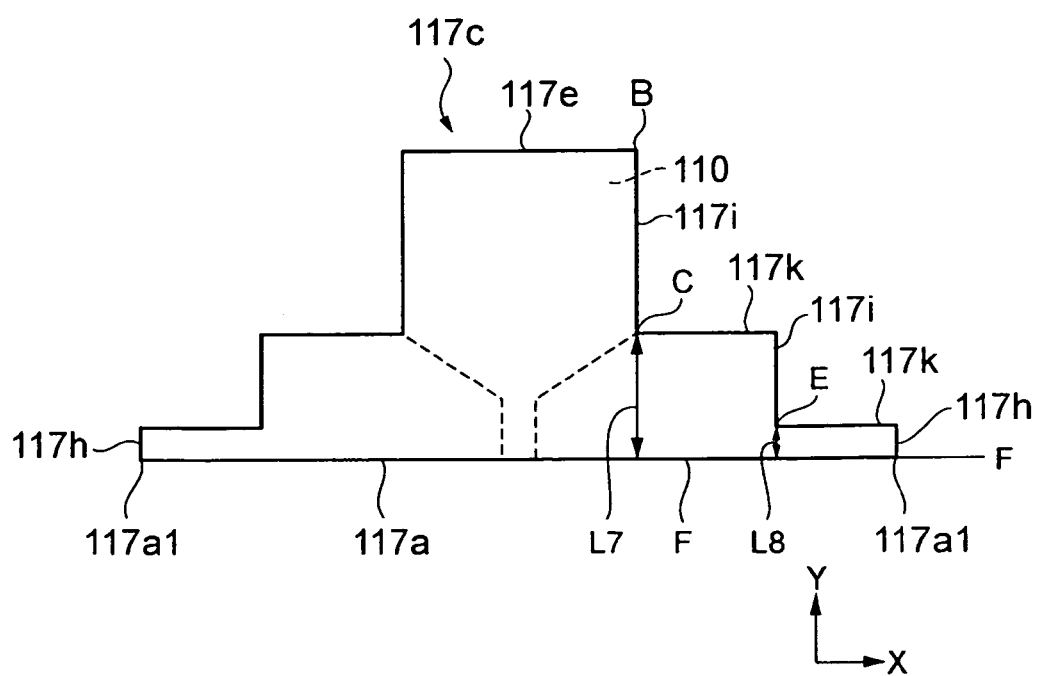
FIG. 8 is a partial plan view showing the perpendicular magnetic recording head according to another embodiment, and particularly showing the perpendicular magnetic recording head having a different shape of the first magnetic layer.
Figure 9:
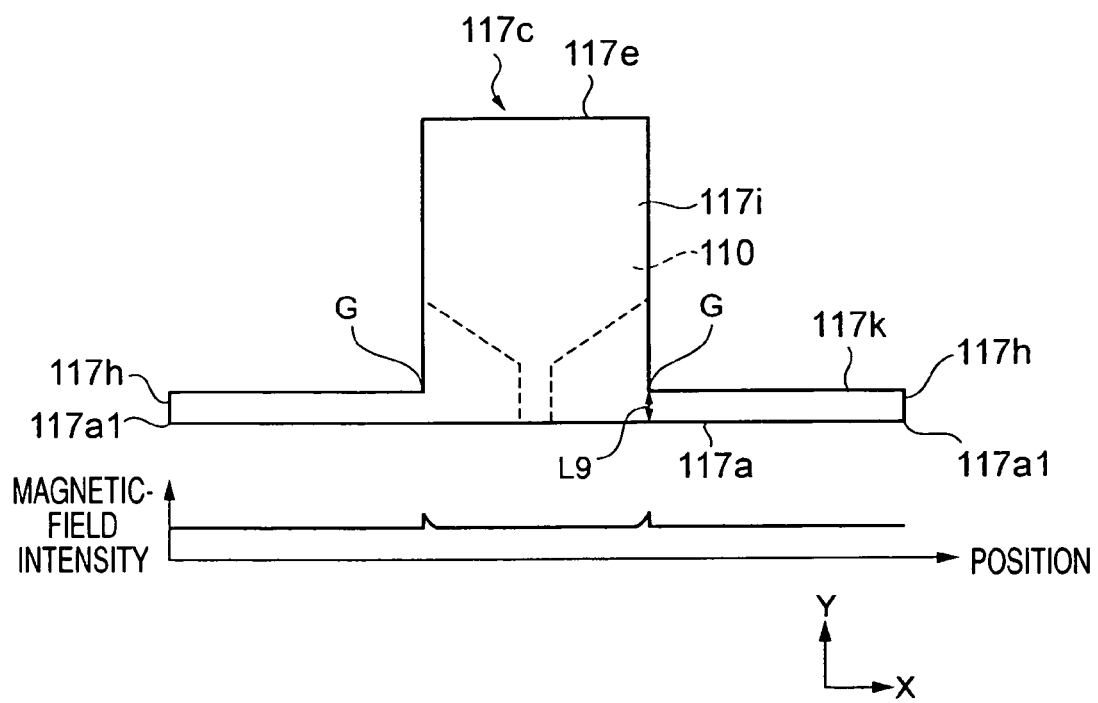
FIG. 9 is a partial plan view showing the perpendicular magnetic recording head according to another embodiment, and particularly showing the perpendicular magnetic recording head having a different shape of the first magnetic layer.

In addition, when the sloping surfaces shown in FIGS. 3 to 7 are not formed on the rear end surface 117c, that is, when the rear end surface 117c is composed of first regulating surfaces 117i extending parallel to the height direction (Y direction) and second regulating surfaces 117k extending parallel to the track-width direction (X direction) as shown in FIGS. 8 and 9, it may be possible to more appropriately suppress the erasing phenomenon of a recorded signal in the embodiment shown in FIG. 8 compared to an embodiment shown in FIG. 9.

In the embodiment shown in FIG. 8, the rear end surface 117c of the return-pass layer 117 includes the rearmost end surface 117e, first regulating surfaces 117i, and second regulating surfaces 117k. The rearmost end surface 117e is provided at the position farthest away from the facing surface F in the height direction (Y direction) and extends parallel to the track-width direction (X direction). Further, the first regulating surfaces extend parallel to the height direction from the side ends of the rearmost end surface 117e toward the facing surface F. Furthermore, the second regulating surfaces extend parallel to the track-width direction from ends (connecting ends) of the first regulating surfaces 117i toward the ends 117a1 of the frontmost end surface 117a. Moreover, corners C, each of which has an angle larger than 180° as viewed from the facing surface F, are provided on both sides in the height direction between each of the first regulating surfaces 117i and each of the second regulating surfaces 117k. In this case, in the embodiment shown in FIG. 8, a pair of first regulating surfaces 117i and a pair of second regulating surfaces 117k are provided close to the facing surface F, and corners E, each of which has an angle larger than 180° as viewed from the facing surface F, are provided on both sides in the track-width direction, respectively. In the embodiment shown in FIG. 8, each of the first regulating surfaces 117i and each of the second regulating surfaces 117k are alternately connected so that a width between first regulating surfaces in the track-width direction (X direction) is reduced in phases from the facing surface F in the height direction.

Meanwhile, in FIG. 9, a rear end surface 117c of the return-pass layer 117 includes first regulating surfaces 117i and second regulating surfaces 117k. The first regulating surfaces extend parallel to the height direction from the side ends of the rearmost end surface 117e. Further, the second regulating surfaces extend parallel to the track-width direction from ends (connecting ends) of the first regulating surfaces 117i toward the ends 117a1 of the frontmost end surface 117a. Moreover, corners G, each of which has an angle larger than 180° as viewed from the facing surface F, are provided between each of the first regulating surfaces 117i and each of the second regulating surfaces 117k, respectively. Each of the ends of the second regulating surfaces 117k is connected to each of the ends 117a1 and 171a1 of the frontmost end surface 117a by each of the side surfaces 117h.

In FIG. 9, the corners G, each of which has an angle larger than 180° as viewed from the facing surface F, are very close to the frontmost end surface 117a. Therefore, a strong magnetic field may be generated from a position of the frontmost end surface 117a having each of the corners G on the rear side thereof toward the medium M. Moreover, long first regulating surfaces 117i are formed near the corners G in the height direction, respectively. Accordingly, a magnetic domain magnetized in the height direction may be formed largely near each of the corners G. As a result, as shown in the lower part of FIG. 9, a strong magnetic field may be generated from a position of the frontmost end surface 117a having each of the corners G on the rear side thereof toward the medium M.

In FIG. 8, the corners C and E, each of which has an angle larger than 180° as viewed from the facing surface F, are respectively provided at two or more places on both sides in the track-width direction. As understood from FIG. 8, a height L7 from each of the corners C to the facing surface F may be longer than a height L9 from each of the corners G shown in FIG. 9 to the facing surface F. Accordingly, in FIG. 8, the intensity of the magnetic field generated from the frontmost end surface 117a having each of the corners C on the rear side thereof may be weakened. The embodiment shown in FIG. 8 is provided with corners E, each of which has an angle larger than 180° as viewed from the facing surface F. However, a height of each of the first regulating surfaces 117i, which extends from each of the corners E in the height direction, may be smaller than a height of each of the first regulating surfaces 117i shown in FIG. 9. Therefore, a magnetic domain magnetized in the height direction may largely not be formed. For this reason, the intensity of the magnetic field generated from the position of the frontmost end surface 117a having each of the corners E on the rear side thereof may be reduced. Consequently, it may be possible to more appropriately suppress the erasing phenomenon of a recorded signal in the embodiment shown in FIG. 8 compared to an embodiment shown in FIG. 9.

Figure 10:
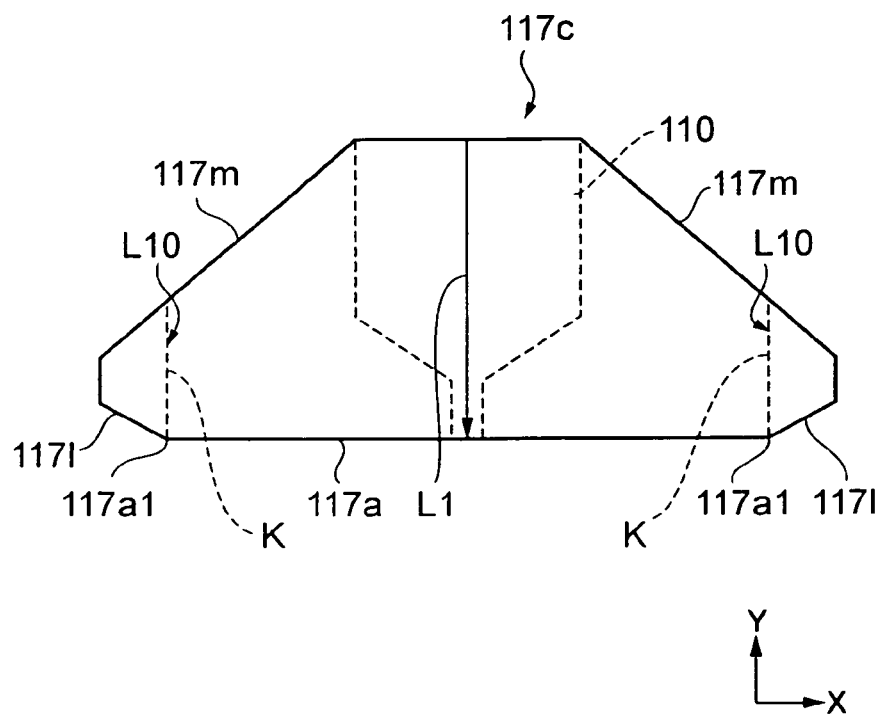
FIG. 10 is a partial plan view showing the perpendicular magnetic recording head according to another embodiment, and particularly showing the perpendicular magnetic recording head having a different shape of the first magnetic layer.
Figure 11:
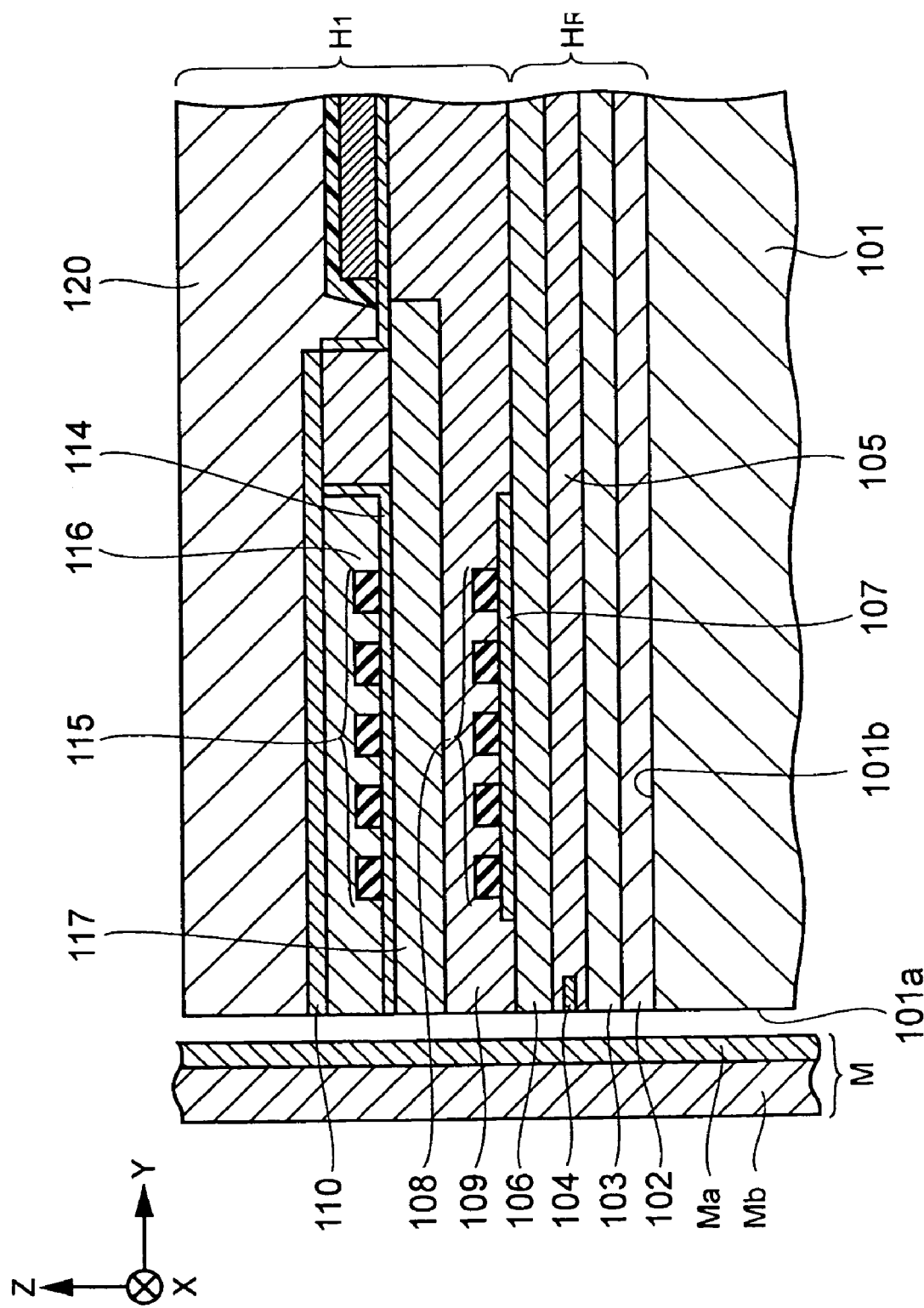
FIG. 11 is a partial cross-sectional view showing a perpendicular magnetic recording head according to another embodiment having a structure different from that of the perpendicular magnetic recording head shown in FIG. 1.
Figure 12:
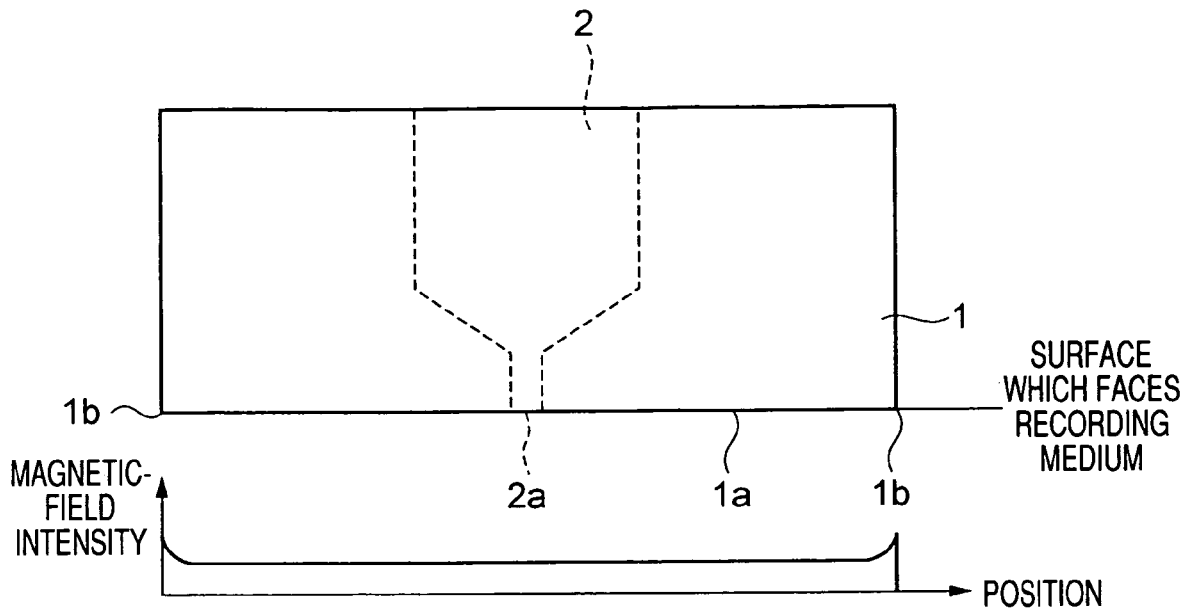
FIG. 12 is a partial plan view showing a perpendicular magnetic recording head in the related art.
Figure 13:
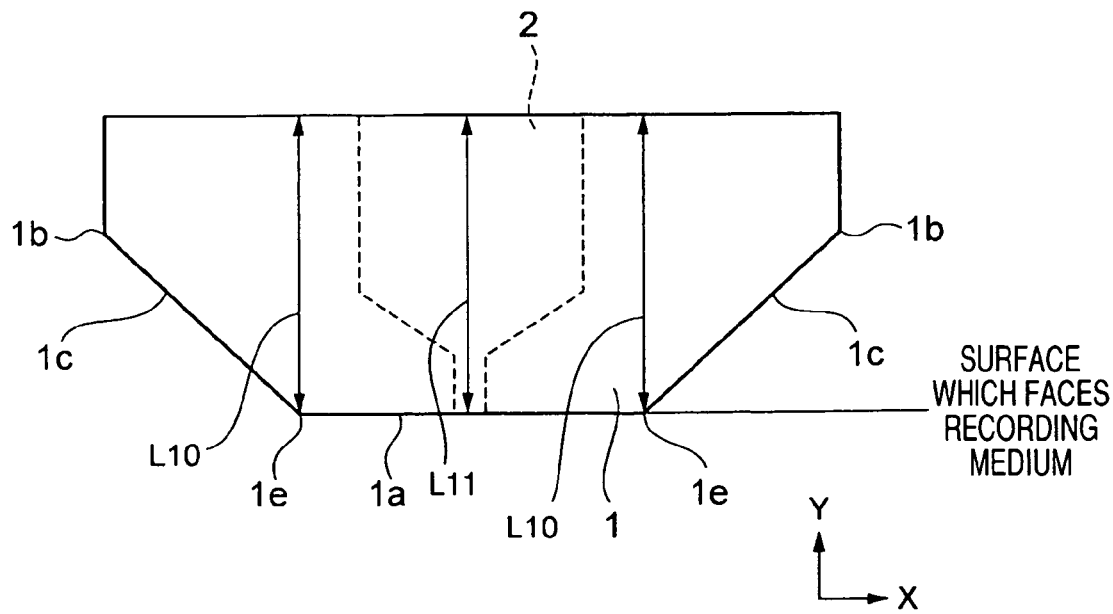
FIG. 13 is a partial plan view showing a perpendicular magnetic recording head in the related art having structure different from that of the perpendicular magnetic recording head shown in FIG. 12.

An embodiment shown in FIG. 10 is provided with sloping surfaces (recess surfaces) 117l and 117l. The sloping surfaces are inclined so that a width between the sloping surfaces in the track-width direction (X direction) gradually increases in the height direction (Y direction) from each of the ends 117a1 and 171a1 of the frontmost end surface 117a. In the embodiment shown in FIG. 10, the front end surface of the return-pass layer 117 is composed of the frontmost end surface 117a flush with the facing surface F and the sloping surfaces 117l and 117l. The sloping surfaces may be provided on each side of the frontmost end surface 117a such that a width between the sloping surfaces in the track-width direction increases in the height direction.

In the embodiment shown in FIG. 10, sloping surfaces 117m are formed on both sides of the rear end surface 117c of the return-pass layer 117 in the track-width direction (X direction) so that a width between the sloping surfaces in the track-width direction is reduced from the facing surface F in the height direction. Each of the sloping surfaces 117m may intersect each of phantom lines K and K lined from both ends 117a1 and 171a1 of the frontmost end surface 117a in the height direction. Accordingly, in FIG. 10, a length L10 in the height direction from each end 117a1 of the frontmost end surface 117a may be shorter than a height L1 from a midpoint thereof. Therefore, a recording magnetic field may not be concentrated on and may not return to the ends 117a1 and 117a1, and the intensity of the magnetic field generated from the ends 117a1 and 117a1 toward the medium M may be appropriately weakened, whereby it is possible to appropriately suppress the erasing phenomenon of a recorded signal.

In contrast to FIG. 1, FIG. 11 shows an embodiment in which a return-pass layer 117 is provided below the main magnetic pole layer 110. However, the invention may also be applied to the perpendicular magnetic recording head shown in FIG. 11.

The invention claimed is:

1. A perpendicular magnetic recording head comprising:
a first magnetic layer and a second magnetic layer, and magnetic field generating units that induce recording magnetic fields on the first magnetic layer and the second magnetic layer, wherein the first magnetic layer comprises a front end surface and a rear end surface, the front end surface comprising a front portion disposed parallel to a facing surface facing a recording medium, wherein a length of the first magnetic layer in a height direction from an end of the front portion is shorter than a length of the first magnetic layer in the height direction from a midpoint of the front portion, wherein the front end surface has front sloping surfaces at both ends of the frontmost end surface such that a width between the front sloping surfaces in the track-width direction increases in the height direction, wherein the rear end surface comprises a rearmost end surface and rear sloping surfaces, the rear sloping surfaces connecting continuously and directly from both ends of the rearmost end surface, the rearmost end surface extending parallel to the track-width direction and is formed at the position farthest away from the facing surface, and a width between the rear sloping surfaces in the track-width direction is gradually reduced from the facing surface in the height direction, wherein the second magnetic layer is confined to an area of the first magnetic layer from a planar view, wherein the rear sloping surfaces are longer than the front sloping surfaces, and wherein each of the rear sloping surfaces is formed to come in contact with a phantom line extending from an end of the front portion in the height direction.

2. The perpendicular magnetic recording head according to claim 1, wherein a length of the front portion in the track-width direction is larger than a length of a front end surface of the second magnetic layer in the track-width direction.

3. The perpendicular magnetic recording head according to claim 1, wherein the first magnetic layer and the second magnetic layer face each other with a space interposed therebetween in a thickness direction.

4. The perpendicular magnetic recording head according to claim 3, further comprising:

a plurality of coil layers disposed on the second magnetic layer with a gap layer therebetween, a front end surface of the gap layer is exposed at the facing surface facing the recording medium; and a coil-insulating layer covering the coil layers, a front end surface of the coil-insulating layer is apart from the facing surface in a height direction, wherein the first magnetic layer covers the whole coil-insulating layer and the gap layer at a position closer to the front end surface of the coil insulating layer.

5. The perpendicular magnetic recording head according to claim 1, wherein the front portion is positioned flush with the facing surface.

6. The perpendicular magnetic recording head according to claim 1, wherein each of the rear sloping surfaces is a linear surface.

7. The perpendicular magnetic recording head according to claim 1, wherein the second magnetic layer and the first magnetic layer have the same width in the track-width direction at the rear end surface of the first magnetic layer in the planar view.

* * * * *